United States Patent [19]

Gimple et al.

[11] 4,406,468
[45] Sep. 27, 1983

[54] SEAL ASSEMBLY

[75] Inventors: James Gimple, Oregon; Richard Weinstein, Toledo, both of Ohio

[73] Assignee: Champion Spark Plug Company, Toledo, Ohio

[21] Appl. No.: 368,302

[22] Filed: Apr. 14, 1982

[51] Int. Cl.³ .......................... F16J 15/12; F16J 15/24
[52] U.S. Cl. .................................................. 277/115
[58] Field of Search ..................... 277/102, 115, 108

[56] References Cited

U.S. PATENT DOCUMENTS

| 407,533 | 7/1889 | Kellogg | 277/115 |
| 3,047,298 | 7/1962 | St. Clair et al. | 277/115 |

FOREIGN PATENT DOCUMENTS 1481364  4/1967  France ................ 277/115

*Primary Examiner*—Robert I. Smith
*Attorney, Agent. or Firm*—Emch, Schaffer & Schaub Co.

[57] ABSTRACT

This invention is a seal assembly for sealing fluid needles, spindles and other movable cylindrical objects where a fluid tight seal is needed between the fluid and non-fluid sides of the movable cylindrical object. The seal includes a packing member with a sharply cut-off tubular end and a stop member with a conical recess, both of which encircle the movable cylindrical object. An unrestrained flow cavity is defined by the packing member and the stop member. Positioned behind the packing member are a spring and washer which axially bias the packing member into the conical recess.

12 Claims, 3 Drawing Figures

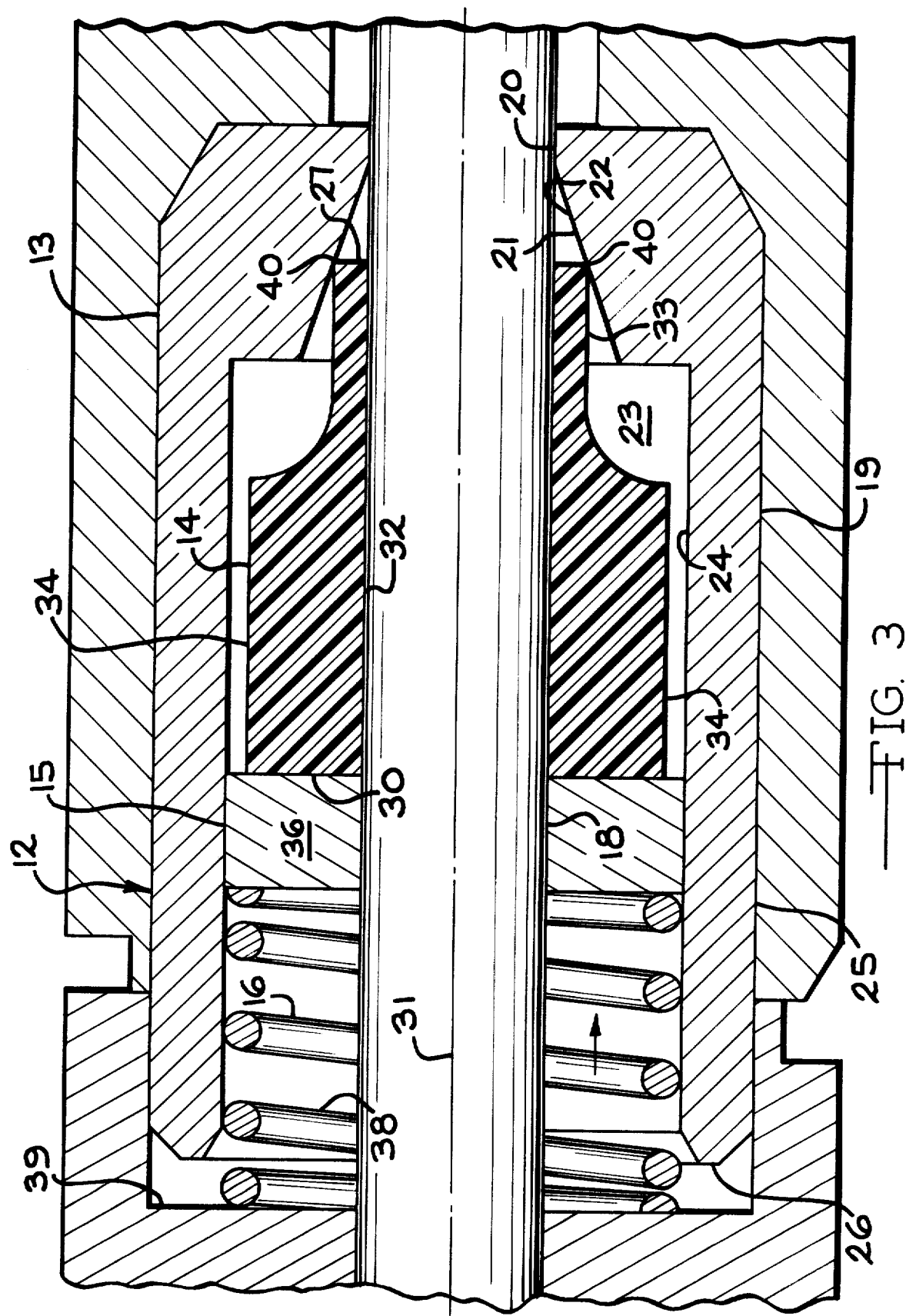

SEAL ASSEMBLY

BACKGROUND OF THE INVENTION

The present invention relates to new and useful improvements in seals for fluid needle valves.

Equipment design often calls for the use of seals about moving parts to prevent the flow of fluid from one area of the apparatus into another. One such use is in the spray paint industry. Spray guns use seals about their fluid needles to prevent the migration of paints and other abrasives into the internal working of the gun where considerable wear and damage can occur. These seals must be able to withstand wide ranges of pressure and have long service lives.

One type of commercial seal presently available is the chevron "V" packing seal. This packing material takes the shape of a chevron or "V" and can be made of any of a number of materials. Normally, this type of seal requires manual adjustment when first inserted into the void between the needle or spindle and the housing to pre-seat the packing. The pre-seating involves the tightening of a gland-nut to compress and seat the packing to initiate the seal. The gland-nut is then loosened until the needle moves freely. Two obvious disadvantages with this type of seal are that pre-seating is required and that the adjustment of the packing is dependent upon the operator's sense of touch or feel.

Another problem is maintaining a tight seal once the packing is installed. Existing "V" type packing sets often have some pockets or cavities spaced along the length of their inside diameters. As the packing material wears, the remaining packing material has to be further compressed to maintain a tight seal. As this wearing occurs, paint is allowed to migrate into these pockets and becomes trapped. As the fluid needle continues to reciprocate, abrasive particles of paint begin to wear the nnedle surface. This continues until a massive leak occurs, at which time both the packing and the needle may be damaged.

Other types of prior art seals include those shown in Banks, U.S. Pat. No. 3,096,096 and Malone U.S. Pat. No. 3,085,628.

The present invention comprises a uniquely designed seal assembly including an insert or stop member and packing assembly which encircle the fluid needle valve. For purposes of illustration the drawings display the seal within a spray gun and as part of a fluid shut-off valve. These specific embodiments are for illustration purposes only and do not limit the use of such seal assemblies in other areas.

The material used to construct the insert or stop member of the present invention is largely dependent upon the design criteria of the equipment within which the seal assembly will be used. Within the present embodiments, the insert is constructed of brass. The exterior of the insert can be any shape necessary to accommodate the dimensions of the equipment within which the fluid needle seal assembly is placed. The interior of the insert includes a tapered annular surface which is designed to accept the packing member.

The angle of the tapered annular inner surface is dependent upon the type of packing material being used, the cold flow characteristics of the packing material and the amount of force exerted against the rear of the packing to urge the packing into contact with the fluid needle. Presently, there are a number of packing materials available, including polyethylene, polypropylene, vinyl, felt, and fluorocarbons such as Teflon and Teflon impregnated felt material. Within the present embodiments, a flurocarbon is used. It has been found that with a Teflon material the preferred angle of taper within the insert or stop member is approximately 15 degrees from the longitudinal axis of the fluid needle.

The packing member itself has a constant inside diameter which is slightly larger than the outside diameter of the needle, thus allowing needle movement while maintaining a tight seal. The outside of the packing member is preferrably stepped or two-tiered, with the outer diameter of the front of the packing member being smaller than the rear.

The front of the packing member, which fits into the tapered annular surface of the stop member insert, is preferrably a sharply cut-off tubular end. Positioned behind the packing member is a back-up washer and a spring. The spring acts against the back-up washer which in turn axially biases the packing member against the tapered annular surface of the insert to force the packing into contact with the fluid needle, thus creating a tight seal.

The advantages of the present seal assembly are many. The first advantage is the ease of assembly and replacement. There is no pre-seating of the packing required and adjustment is not subject to operator error. The operator simply installs a seal assembly and the spring continuously applies the force needed to create a proper seal. As a result, no adjustment is needed throughout the life of the packing. Once the packing reaches the end of its useful life, the operator simply removes the old packing and installs a new one.

Another advantage lies in the unique design and the resultant interface of the packing material and the tapered annular surface of the stop member. Most commercial seals require periodic adjustment because they rely on a replacement of packing material that has been worn away by compressing new material into the void. Existing "V" type packings rely on a reduction of the packing inner diameter. This reduction takes place only if movement of each packing section exists. This movement causes a wedge to spread the packing lip towards the center line, thus decreasing the packing inner diameter. Proper design practice, as recommended by packing manufacturers, dictates the use of a tight fit between the packing outer diameter and the housing. This tightness inhibits packing section movement thus resulting in early packing leakage. When this occurs, additional adjustments to the gland-nut are required.

The seal assembly, according to the present invention, does not rely on outer diameter packing movement for a tight seal. Instead, all the forces applied to the packing material are directed towards the reciprocating fluid needle. This is accomplished by minimizing the contact area between the packing and the insert through the use of the tapered annular surface of the stop member and the sharply cut-off tubular front end of the packing. The resultant seal between the Teflon packing and the metal needle occurs over a very small longitudinal portion of the needle. This results in the application of the major sealing forces at the very front edge of the seal only, which in turn reduces the amount of friction along the remainder of the packing.

In contrast, a standard chevron "V" packing distributes its force equally along each side of the packing. This results in higher friction along the entire length of the packing and a lower sealing force per unit of area against the needle for an equivalent spring force.

Finally, advantages lie in the increased useful life of each packing. Due to the seal assembly's unique design, its useful life has been found to exceed other commercially available seals by a factor of up to five to one.

BRIEF DESCRIPTION OF THE DRAWINGS

FIG. 3 is an expanded view of the partial cross section of FIG. 1.

DESCRIPTION OF THE PREFERRED EMBODIMENTS

Figure 1:
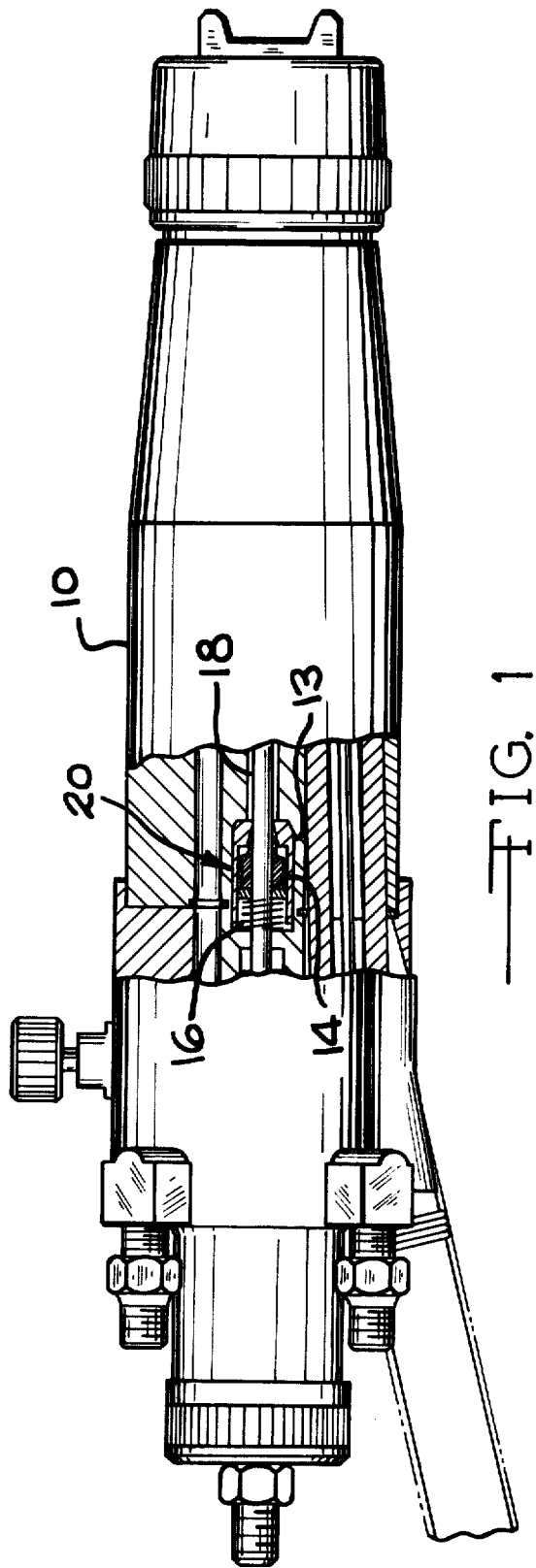
FIG. 1 is a plan view, partially in cross section, of a seal assembly according to the present invention positioned within a paint spray gun.

Referring to FIG. 1, a paint spray gun 10 of a type known in the art includes a seal assembly 12, according to the present invention. The assembly 12 includes an insert or stop member 13, a packing member 14, a washer 15, and a spring 16, all of which encircle a fluid needle 18 of the spray gun 10.

As shown in FIG. 3, the stop member 13 has an exterior surface 19 designed to fit the shape of the housing within which the assembly 12 is placed. A leading interior edge 20 of the stop member 13 is just slightly larger in diameter than the outside diameter of the fluid needle 18 to allow free movement of the fluid needle 18. Directly behind the leading interior edge 20 is a tapered surface 21 which in the present embodiment defines a conical recess 22. The conical recess 22 opens into the interior 23 of the stop member 13. The stop member 13 includes an interior wall 24, an exterior wall 25 and an end 26.

Within the stop member 13, is positioned the packing member 14 which encircles the fluid needle 18. The packing member 14 has opposed first and second ends 27 and 30. First end 27 is substantially perpendicular to the longitudinal axis 31 of the fluid needle 18. An interior surface 32 of the packing member 14 is of a constant diameter just slightly larger than the outer diameter of the fluid needle 18. The exterior of the packing is comprised of a first exterior portion 33 and a second exterior portion 34. The first portion 33 is smaller in diameter than the second portion 34 and is designed to fit into the conical recess 22 of the stop member 13.

The second portion 34 of the packing member 14 has a diameter sufficiently large to support a washer 36. As shown in FIG. 3, the diameter of second portion 34 is less than the diameter of the interior wall 13 of stop member 10. In the present embodiment, the outer surface of the second portion 34 of the packing member 14 and the interior wall 24 of the stop member define a relief space. In other embodiments the diameter of the second portion 34 is extended outwardly to contact the interior wall 24.

The washer 36 abuts the second end 30 of the packing member 14. Positioned behind the washer 36 is a spring 38. The spring 38 can be held in position at its opposite end by a wall 39.

The spring 38 supplies the necessary force needed to create an effective seal. The force of spring 38 is applied against washer 36 as shown by the arrow in FIG. 3. The washer 36 in turn uniformly distributes the spring force against the second end 30 of packing member 14.

As a result of the force acting against the packing member 14, the first end 27 of packing member 14 is urged into the conical recess 22. A knife-edged contact indicated by the reference number 40 is made between packing member 14 and tapered surface 21 thus forcing the first end 27 of packing member 14 into tight contact with the fluid needle 18 thereby creating a proper seal.

As the packing member 14 wears, the first end 27 of packing member 14 continues to advance into the recess 22 which serves as an unrestrained flow cavity. This result is due to the constant spring force being applied to the second end 30 of packing member 14. By concentrating the loading forces at the knife-edge contact line 40, the amount of loading per unit of area is greatly increased thus creating an improved seal. In addition, by concentrating the loading forces at the first end 27 of packing member 14, the wear along interior surface 31 of packing member 26 is greatly reduced due to the elimination of loading along the remainder of this surface. The unrestrained flow cavity 22 provides a spaced for movement of the packing material 14 upon wear. The packing material 14, in the present embodiment is a Teflon material. It has been found that the spring 16 which urges the first end 27 of the packing material 14 into the cavity 22 and against the tapered surface 21. The resultant force vectors the packing material 14 into a sealing relationship with the needle 18.

Figure 2:
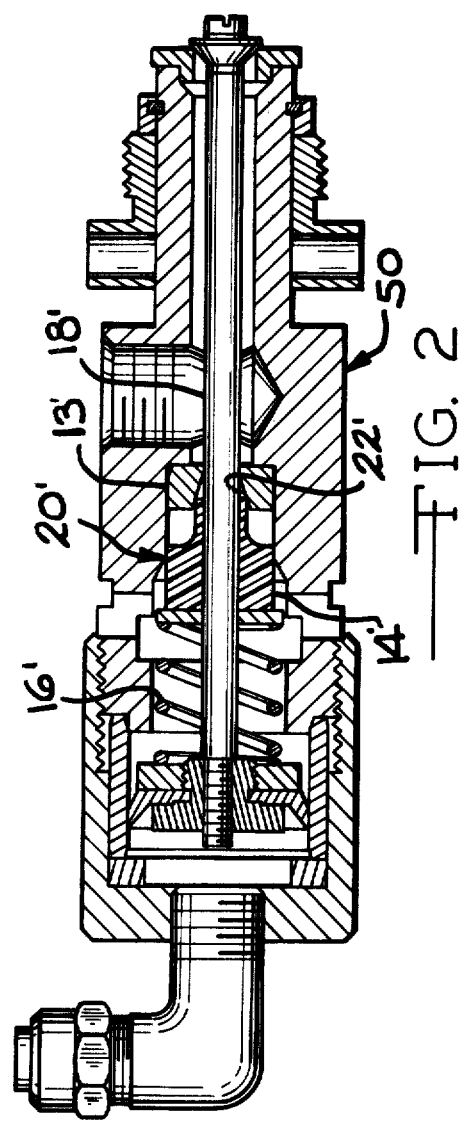
FIG. 2 is a cross sectional view of a seal assembly according to the present invention positioned within a fluid shut-off valve.

Another embodiment is shown in FIG. 2. A fluid shut-off valve is indicated by the reference number 50. The valve 50 includes a valve needle 18' and a seal assembly 20', according to the present invention. The assembly 20' includes a shortened insert or stop member 13' which defines a recess 22'. A packing member 14' has one end received in the recess 22'. A spring 16' engages the other end of the packing member 14' into the recess 22' to effect the seal, as discussed above.

Having described the invention in detail and with reference to the drawings, it is understood that such specifications are given only for the sake of explanation. Various modifications and substitutions, other than those cited, can be made without departing from the scope of the invention as defined by the following claims.

What I claim is:

1. A seal for sealing the periphery of a cylindrical object, comprising a packing member, having opposed first and second ends, surrounding such cylindrical object, said packing member constructed of a cold flowable material, a stop member surrounding such cylindrical object, said stop member defining a recess, said recess having a tapered surface positioned in contact with said first end of said packing member, said first end of said packing material being positioned within said recess of said stop member, said first end of said packing member engaging said tapered surface of said stop member and forming a generally line contact, whereby a high sealing pressure is created opposite such line contact between said cylindrical object and said first end of said packing member, said packing member and said stop member defining an unrestrained flow cavity adjacent said object, and spring means positioned adjacent said packing member for urging said packing member toward said flow cavity, wherein said packing member advances into such flow cavity during use and wear of said packing member.

2. A seal according to claim 1, wherein said cold flowable material is a fluorocarbon.

3. A seal according to claim 1, wherein said stop member is constructed of brass.

4. A seal according to claim 1, including a support member positioned between said spring and said packing member.

5. A seal according to claim 1, wherein said tapered surface is at an angle of approximately 15 degrees from the longitudinal axis of said cylindrical object.

6. A seal according to claim 1, wherein said packing member includes a first cylindrical portion and a second cylindrical portion, said first portion of said packing member having a smaller diameter than said second portion, said first portion being positioned within said stop member recess, said first portion of said packing member having a front end substantially perpendicular to the longitudinal axis of said cylindrical object, said front end of said first portion of said packing member engaging said tapered surface of said stop member.

7. A seal according to claim 1, wherein the exterior surface of the first cylindrical portion of said packing member is spaced from said stop member, said packing member and said stop member defining a relief space.

8. A seal according to claim 1, wherein said first end of said packing member is substantially perpendicular to the longitudinal axis of said cylindrical object.

9. A seal for sealing the periphery of a fluid needle in a spray gun comprising a packing member having opposed first and second ends, surrounding such fluid needle, said stop member defining a conical recess, said recess having a tapered surface positioned in contact with said first end of said packing member, said tapered surface defining an acute angle with the longitudinal axis of said cylindrical object, said first end of said packing material being positioned within said conical recess of said stop member, said packing member and said stop member defining an unrestrained flow cavity adjacent said fluid needle, said first end of said packing member engaging said tapered surface of said conical recess and forming a generally line contact, whereby a high sealing pressure is created opposited such line contact between said fluid needle and said packing member and spring means positioned behind said washer for urging said packing member toward said flow cavity, wherein said packing member advances into such flow cavity during use and wear of said packing member.

10. A seal according to claim 9 wherein said packing member is constructed of a cold flowable material.

11. A seal according to claim 9 wherein a portion of the exterior surface of said packing member is spaced from a portion of the interior surface of said stop member thereby defining a relief space.

12. A seal according to claim 11, wherein said stop member receives said packing member and said first end of said packing member is substantially prependicular to the longitudinal axis of said fluid needle.

* * * * *